MAGNETIC RECORD ERASER

Filed Aug. 24, 1950

INVENTOR.
EUGENE H. LOMBARDI
BY H. A. Madley
ATTORNEY

Patented May 12, 1953

2,638,507

UNITED STATES PATENT OFFICE 2,638,507

MAGNETIC RECORD ERASER

Eugene H. Lombardi, Port Chester, N. Y., assignor to General Precision Laboratory Incorporated, a corporation of New York Application August 24, 1950, Serial No. 181,183

3 Claims. (Cl. 179—100.2)

This invention pertains to telegraphones and more specifically to a magnetic record eraser for use as a component of magnetic voice-recording instruments.

In employing the telegraphone to record voice or other sound on a moving magnetic tape or wire, it is established practice to provide some sort of demagnetizing device to erase the magnetic record, so that the magnetic tape or wire can be reused. The demagnetizing effect is ordinarily secured by magnetizing the tape or wire strongly, first in one direction and then in another direction. If this magnetization is for any reason not as strong as the recorded magnetic peaks, they will not be wiped out completely by this demagnetization process, and some of the record will remain to interfere with subsequent re-recording.

It is theoretically possible to erase by magnetically saturating the tape or wire in a direction at right angles to the direction of recording but in practice this is not possible because the recording field is never exactly straight, and even if it were straight the mechanical tolerances involved do not permit the employment of an erasing field oriented at right angles thereto with sufficient exactness. As a result, an erasing field component in line with the recording field would always be produced. The existence of any magnetization having a constant direction with a component in line with the recording field has a very bad effect on recording quality, because it results in even harmonics of the recorded voice, causing poor quality of reproduction.

The existence of even harmonics in alternating current employed for demagnetization has the same effect as the employment of direct current magnets for demagnetization, so that it is imperative, in employing demagnetizing magnets supplied with alternating current, to use alternating current that is completely free of second and higher order even harmonics. This applies to the use of supersonic frequencies as well to the use of 60-cycle frequency.

In the use of alternating current demagnetizing magnets it is necessary either to employ frequencies above audibility or to subject each element of the recording tape or wire to a gradually decreasing demagnetizing magnetic force, otherwise each element will be left in that magnetic state corresponding to the portion of the magnetic demagnetizing cycle last impressed upon it. Furthermore, the decrease of the demagnetizing force is required to be so slow that each magnetic loop or cycle through which each element of the tape or wire is conducted surrounds the magnetic zero. If this is not the case, residual magnetism will be left in some parts of the tape or wire and the effect will be to leave "noise" on the tape or wire. That is, rerecording will be marred by background of noise when played back.

All prior erasing devices now contain one or more of the above-described defects, and in addition many of them require auxiliary equipment. Some erasing devices employ permanent magnets and invariably fail to remove all magnetic bias. Other erasing devices employ supersonic frequencies for erasing and therefore require the use of a supersonic generator as an auxiliary. In addition, the generated supersonic power is usually not free of even order harmonics. Even if the supersonic electric power source is transformer- or condenser-coupled, even-order harmonics in the output will nevertheless cause distortion in voice recordings.

The instant invention is free from all of these faults. The preferred power supply frequency is 60-cycle or other commercially-used frequency that is easily secured from commercial circuits, which are ordinarily free from even order harmonics. The invention submits elementary parts of the record wire and tape to a maximum demagnetizing force for a sufficient length of time to insure saturation, and then subjects the elements to gradually decreasing alternating magnetization over a sufficient number of cycles to insure complete demagnetization.

One object of the instant invention is therefore to provide a magnetic eraser that is easily and cheaply constructed, and that erases a magnetic record from a recording tape or wire with such effectiveness as to leave it in as good condition as if it had never before been used for recording.

A further object of this invention is to provide a magnetic eraser employing commercial alternating current as its power supply.

Another object of this invention is to provide a magnetic eraser that applies a demagnetizing field to the record wire or tape of a magnetic recorder in the direction that is most effective to demagnetize the wire or tape.

Still another object of this invention is to provide a magnetic eraser that insures magnetic saturation of every part of the magnetic tape or wire.

A still further object of this invention is to provide a magnetic eraser that employs several demagnetizing cycles of successively less intensity, the rate of decrease of intensity being low.

A further understanding of the invention may be secured from the detailed description and the accompanying drawings, in which.

Figure 4:
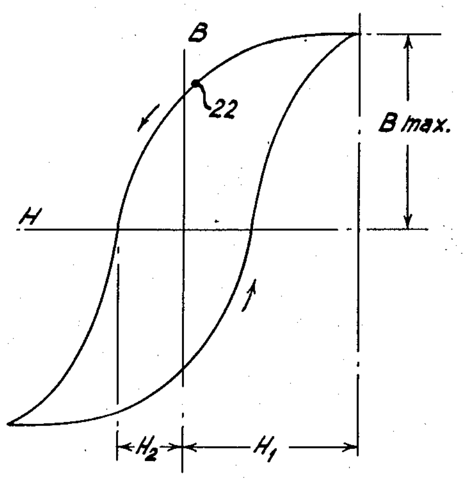
Figure 4 is a ferromagnetic hysteresis loop.

Referring now to the figures, a core 11, preferably laminated, is provided with two pole pieces 12 and 13 separated by a gap G. Surrounding one leg 14 of the core 11 is a coil of wire 16, the two terminals of which 17 are brought out for connection to a source of alternating current schematically represented at 18. This source 18 may provide electric power of any frequency, the only requirements being that the voltage be suitable for supplying the electromagnet and that it have no even harmonics. However, it is convenient to use a commerical 60-cycle source and this is possible in most instances because such sources ordinarily are quite free from even harmonics. Another advantage of employing 60-cycle power is that an electromagnet when designed for 60 cycles is inherently more efficient than when designed for higher frequencies, so that for a given induction in the gap the magnet takes less power, heats less, and is smaller. Still another advantage of the use of commercial frequency power that is controlling in equipment made to sell in price competition is its convenience and cheapness, for it either entirely eliminates the supersonic generator, or, in cases where the supersonic generator must be retained to supply recording bias, permits drastic reduction in its size.

Figure 1:
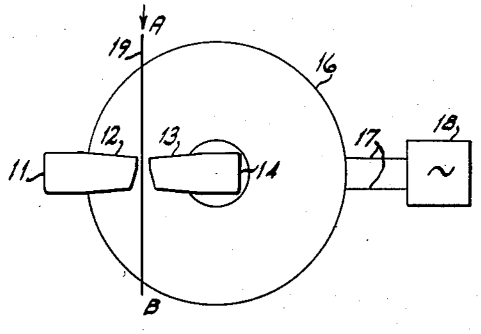
Figure 1 is a top view of an electromagnet embodying the invention.
Figure 2:
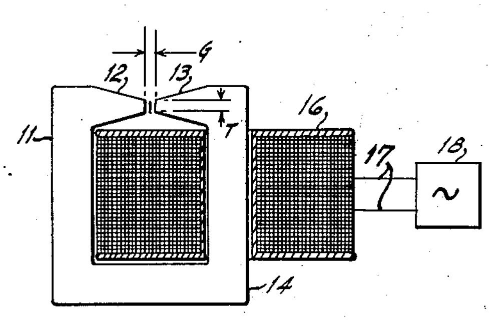
Figure 2 is a side view of the electromagnet of Fig. 1.

The line 19 between the pole pieces 12 and 13 represents a record tape, the thickness T of the pole pieces in Fig. 2 being approximately equal to the tape width. In place of tape, wire may be employed and the pole piece widths made correspondingly smaller. In order to demagnetize the tape it is moved in the direction of the arrow, from A to B in Fig. 1, so that it passes continuously through the magnetic gap. Meanwhile the coil 16 is energized so that the tape while moving is subjected to a transverse alternating magnetic field. This transverse field is most effective in demagnetizing tape that has been magnetized longitudinally in recording, which is the usual direction of recording, but the eraser will also demagnetize tape that has been recorded transversely.

Figure 3:
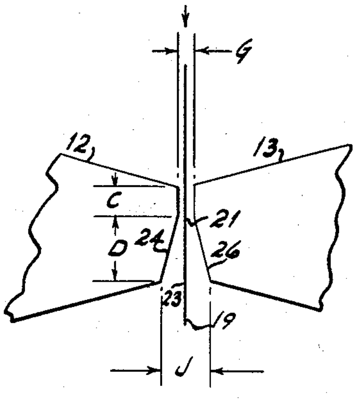
Figure 3 is an enlarged view of the pole pieces of Fig. 1.

The magnetic gap and the pole pieces 12 and 13 are shown to a larger scale in Fig. 3. The gap has two sections: a first section C of constant gap dimension G, and a second section D in which the gap widens from the dimension G to a dimension J. During passage of the tape through C in the direction of the arrow any selected element of it is subjected to an alternating field of maximum intensity, and the electromagnet design is such that this maximum intensity of field saturates the tape. The length of the section C is made great enough to insure that each element of the tape will be subjected to at least one full cycle of the demagnetizing field during its passage, which of course is sufficient because magnetization is, practically speaking, an instantaneous process. However, to insure that one full cycle is effective even if the frequency be lowered and also to overcome fringing effects and to permit the use of large mechanical tolerances, a large safety factor is preferred in the design of the section C. For instance, it may be made so long that at least nominally the tape is subjected to six full alternations at maximum magnetization so that, if the tape speed is two and a half inches per second, and the frequency is 60 C. P. S., the length C becomes one-quarter inch. Any selected elementary ferromagnetic particle of the tape is therefore nominally carried through six complete cycles of magnetization as it passes through the section C and at the instant it arrives at the point 21 and is about to leave the section its magnetization may be at any point of its cycle. That is, the elementary particle is carried around its hysteresis loop, such as that shown in Fig. 4, and may, for example, when it leaves section C, be at the point 22 on the loop.

From the point 21, Fig. 3, to point 23 the tape passes through section D of the magnetic gap which becomes progressively wider. The tape is therefore subjected to a progressively weaker demagnetizing field in this section until at the point 23 the field is very weak indeed. The sides 24 and 26 of the pole pieces 12 and 13 in this section of the gap are shown straight, but their shape may be otherwise as desired to control the exact mode of diminution of the field. In any case, however, the rate of diminution should be controlled by the following principle. Referring to Fig. 4, let the maximum field strength in a particular one half-cycle of diminishing magnetization be represented by the field intensity $H_1$. It will be capable of producing the magnetic induction $B_{max}$. Then the peak negative field intensity in the next half cycle must be at least $H_2$, otherwise the record element will be left with a residue of positive magnetism, which will persist no matter how ensuing field cycles diminish. The factor which equals $H_2/H_1$, representing the speed of diminution of the field, depends upon the coercive force of the tape material, which in turn varies with the degree of magnetization of the record particle. Therefore the factor will change, gradually increasing as the record particle moves through the gap section D. By the time the record particle reaches the point 23 and leaves the field its residual magnetism must have been brought so near zero that upon rerecording and playback the record tape acts in all respects like a new tape that has not previously been recorded upon. This is the requirement upon which the design of the dimension J in Fig. 3 is based. As one example where the dimension D was given a value of one-half inch so that the tape was subjected to twelve cycles of diminishing field intensity, the dimension J was made approximately three times that of G.

What is claimed is:

1. A magnetic record eraser comprising, a ferromagnetic core the ends of which are formed into a pair of juxtaposed pole pieces separated by a gap adapted for the passage of a magnetic record medium therethrough, a coil surrounding said core, a source of alternating current energizing said coil, said pole pieces having a portion of their juxtaposed ends provided with faces parallel to each other and the remaining portions thereof with faces diverging in the direction of travel of said record medium, the angle of divergence being such that the peak of any half cycle of magnetic field produced at any point therebetween along the travel of said magnetic record medium is at least as great as the instantaneous coercive force of any element of said record medium passing said point.

2. A magnetic record eraser as defined in claim 1 in which the length of the parallel portion of said pole pieces is sufficient to insure that at least one full cycle of demagnetizing field is imposed on said record medium in its passage therethrough.

3. A magnetic record eraser comprising, a ferromagnetic C-shaped core the ends of which form a pair of confronting pole pieces separated by a gap adapted for the passage of a record medium therethrough, a coil surrounding said core, a source of 60 cycle alternating current energizing said coil, said pole pieces having a portion of their confronting ends provided with parallel faces of such length as to insure that at least one full cycle of demagnetizing field is impressed on said record medium in its passage therebetween and so spaced as to insure saturation of said record medium, the remaining portions of said pole pieces having faces diverging in the direction of travel of said record medium, the angle of divergence being such that the peak of any half cycle of magnetic field produced at any point therebetween along the travel of said record medium is at least as great as the instantaneous coercive force existing in any element of said record medium passing said point, said remaining portions of said pole pieces having a length such that in its passage from the field created therebetween the residual magnetism of said record medium is reduced substantially to zero.

EUGENE H. LOMBARDI.

References Cited in the file of this patent

UNITED STATES PATENTS

| Number | Name | Date |
|---|---|---|
| 1,837,586 | Rhodehamel | Dec. 22, 1941 |
| 2,288,862 | Weitmann | July 7, 1942 |
| 2,498,423 | Howell | Feb. 21, 1950 |
| 2,535,481 | Begun | Dec. 26, 1950 |
| 2,535,712 | Wolfe | Dec. 26, 1950 |
| 2,538,892 | Begun | Jan. 23, 1951 |

FOREIGN PATENTS

| Number | Country | Date |
|---|---|---|
| 652,011 | Germany | Oct. 23, 1937 |
| 691,711 | France | July 21, 1930 |